United States Patent [19]
Katsumi et al.

[11] Patent Number: 5,459,004
[45] Date of Patent: Oct. 17, 1995

US005459004A

[54] PROCESS FOR PREPARING HYDROXYGALLIUM PHTHALOCYANINE CRYSTALS AND ELECTROPHOTOGRAPHIC PHOTORECEPTOR USING THE CRYSTALS

[75] Inventors: Katsumi Daimon; Katsumi Nukada; Akira Imai; Masakazu Iijima; Toru Ishii, all of Minami Ashigara, Japan

[73] Assignee: Fuji Xerox Co., Ltd., Tokyo, Japan

[21] Appl. No.: 38,299

[22] Filed: Mar. 29, 1993

[30] Foreign Application Priority Data

Mar. 31, 1992 [JP] Japan .................. 4-103825

[51] Int. Cl.$^6$ ........................................ G03G 5/00
[52] U.S. Cl. .................................. 430/78; 430/76
[58] Field of Search ............................... 430/78, 76

[56] References Cited

U.S. PATENT DOCUMENTS

| | | | |
|---|---|---|---|
| 2,770,629 | 1/1952 | Eastes | 260/314.5 |
| 3,160,635 | 12/1964 | Knudsen et al. | 260/314.5 |
| 3,357,989 | 12/1967 | Byrne et al. | 260/314.5 |
| 3,708,292 | 1/1973 | Brach et al. | 96/1.5 |
| 4,031,109 | 6/1977 | Griffiths et al. | 430/76 |
| 5,302,710 | 4/1994 | Nukada et al. | 430/78 |
| 5,304,446 | 4/1994 | Diamon et al. | 430/78 |

FOREIGN PATENT DOCUMENTS

| | | |
|---|---|---|
| 48-34189 | 5/1973 | Japan . |
| 49-105536 | 10/1974 | Japan . |
| 50-38543 | 4/1975 | Japan . |
| 57-148745 | 9/1982 | Japan . |
| 61-151659 | 7/1986 | Japan . |
| 61-171771 | 8/1986 | Japan . |
| 1-221459 | 9/1989 | Japan . |

OTHER PUBLICATIONS

*Denshishashin Gakkaishi*, vol. 28, No. 3, pp. 269–273 (1989).

Primary Examiner—Mark A. Chapman
Attorney, Agent, or Firm—Oliff & Berridge

[57] ABSTRACT

A process for preparing hydroxygallium phthalocyanine crystals showing intense diffraction peaks at Bragg angles $(2\theta \pm 0.2)$ of 7.5°, 25.1°, and 28.3° with respect to $CuK_\alpha$ characteristic X-rays which comprises mechanically grinding hydroxygallium phthalocyanine and then treating the grains with a solvent is disclosed. The hydroxygallium phthalocyanine crystals obtained by the process of the present invention has a novel crystal form and exhibits high sensitivity and excellent durability on repeated use as well as crystal form stability. The electrophotographic photoreceptor prepared by using the resulting hydroxygallium phthalocyanine exhibits excellent electrophotographic characteristics.

19 Claims, 8 Drawing Sheets

PROCESS FOR PREPARING HYDROXYGALLIUM PHTHALOCYANINE CRYSTALS AND ELECTROPHOTOGRAPHIC PHOTORECEPTOR USING THE CRYSTALS

FILED OF THE INVENTION

This invention relates to a process for preparing novel hydroxygallium phthalocyanine crystals useful as a photoconductive material and an electrophotographic photoreceptor using the resulting crystals.

BACKGROUND OF THE INVENTION

Phthalocyanine compounds are useful as coatings, printing inks, catalysts or electronic materials. In recent years, they have been extensively studied particularly for their use as electrophotographic photoreceptor materials, optical recording materials and photoelectric conversion materials.

In the field of electrophotographic photoreceptors, there has recently been an increasing demand to develop an organic photoconductive material having its photosensitive wavelength region extended to a longer side of near infrared light (780 to 830 nm) which corresponds to a wavelength region of a semiconductor laser so that it can be applied to a digital recording system, such as a laser printer. Known photoconductive materials for semiconductor lasers so far proposed from this viewpoint include squarylium compounds as disclosed in JP-A-49-105536, triphenylamine type tris-azo compounds as disclosed in JP-A-61-151659, and phthalocyanine compounds as disclosed in JP-A-48-34189 and JP-A-57-148745 (the term "JP-A" as used herein means an "unexamined published Japanese patent application").

In cases where an organic photoconductive material is used as a photosensitive material for semiconductor lasers, it is required to have a photosensitive wavelength region extended to a longer side and to provide a photoreceptor having satisfactory sensitivity and durability. None of the above-described conventional organic photoconductive materials sufficiently satisfies these requirements.

In an attempt to overcome the drawbacks of the conventional organic photoconductive materials, the relationship between their crystal form and electrophotographic characteristics has been studied. In particular, many reports have hitherto been made on phthalocyanine compounds.

It is known that phthalocyanine compounds generally exhibit several different crystal forms depending on the process of production or the process of treatment and that the difference in crystal form has a great influence on their photoelectric conversion characteristics. For example, known crystal forms of copper phthalocyanine compounds include $\alpha$-, $\pi$-, $\chi$-, $\rho$-, $\gamma$-, and $\delta$-forms as well as a stable $\beta$-form. These crystal forms are known capable of interconversion by a mechanical strain, a sulfuric acid treatment, an organic solvent treatment, a heat treatment, and the like as described, e.g., in U.S. Pat. Nos. 2,770,629, 3,160,635, 3,708,292, and 3,357,989. Further, JP-A-50-38543 refers to the relationship between a crystal form of copper phthalocyanine and its electrophotographic characteristics.

Phthalocyanine crystals having any desired crystal form have generally been prepared by treating phthalocyanine having been subjected to acid pasting or mechanical grinding with an appropriate solvent. Special treatments for improving their electrophotographic characteristics have been reported. For example, JP-A-61-171771 discloses purification of phthalocyanine crystals by treatment with N-methylpyrrolidone for improvement in electrophotographic characteristics. Influences of impurities on electrophotographic characteristics have also been reported. For example, *DENSHISHASHIN GAKKAISHI*, Vol. 28, No. 3, p. 269 (1989) describes that repetition of purification by sublimation brings about great changes of electrophotographic characteristics with the structure and crystal form being equal. With reference to hydroxygallium phthalocyanine crystals, JP-A-1-221459 refers to the relationship between the crystal form and electrophotographic characteristics with respect to the crystals obtained by acid pasting only.

However, any of the phthalocyanine compounds proposed to date, inclusive of the above-mentioned hydroxygallium phthalocyanine crystals, is still unsatisfactory in photosensitivity and durability when used as a photosensitive material. Even when the above-mentioned special process for production or treatment may be followed, satisfactory photosensitivity and durability as a photosensitive material has not yet been reached. It has thus been demanded to develop a new phthalocyanine crystal with improved photosensitivity and improved durability while retaining characteristics of phthalocyanine compounds.

SUMMARY OF THE INVENTION

An object of the present invention is to provide a process for preparing hydroxygallium phthalocyanine crystals excellent in photosensitivity and durability.

Another object of the present invention is to provide an electrophotographic photoreceptor containing such hydroxygallium phthalocyanine crystals.

As a result of extensive investigations, the inventors have found that novel hydroxygallium phthalocyanine crystals exhibiting high sensitivity and durability as a photoconductive material can be obtained by subjecting synthetically obtained hydroxygallium phthalocyanine to a specific combination of a solvent treatment and mechanical grinding and that an electrophotographic photoreceptor containing the novel crystals in the photosensitive layer exhibits excellent electrophotographic characteristics, and thus reached the present invention.

The present invention relates to a process for preparing hydroxygallium phthalocyanine crystals showing intense diffraction peaks at Bragg angles ($2\theta \pm 0.2$) of 7.5°, 25.1°, and 28.3° with respect to $CuK_\alpha$ characteristic X-rays which comprises mechanically grinding hydroxygallium phthalocyanine and then treating with a solvent, preferably at least one of amides, esters, and ketones.

The mechanical grinding may be preceded by a preliminary treatment with a similar solvent. The hydroxygallium phthalocyanine to be subjected to the preliminary solvent treatment may previously be finely ground by acid pasting or mechanical grinding.

The present invention also relates to an electrophotographic photoreceptor comprising a conductive substrate having thereon a photosensitive layer containing hydroxygallium phthalocyanine crystals prepared by the above-mentioned process.

DETAILED DESCRIPTION OF THE INVENTION

Hydroxygallium phthalocyanine compounds according to the present invention are represented by formula:

wherein $R_1$, $R_2$, $R_3$, and $R_4$ each represent a halogen atom or an aliphatic alkoxy group having from 1 to 5 carbon atoms; and k, l, m, and n each represent an integer of from 0 to 4.

Hydroxygallium phthalocyanine which can be used as a starting material in the present invention can be synthesized by, for example, acid- or alkali-hydrolysis or acid pasting of chlorogallium phthalocyanine synthesized by known processes.

In the present invention, the synthetic hydroxygallium phthalocyanine is subjected to a series of treatments, i.e., mechanical grinding and a solvent treatment (hereinafter referred to as a second solvent treatment), and if desired, a preliminary solvent treatment (hereinafter referred to as a first solvent treatment) preceding the mechanical grinding to obtain hydroxygallium phthalocyanine crystals showing intense diffraction peaks at Bragg angles (2θ±0.2° C.) of at least 7.5°, 25.1° and 28.3° and preferably 7.5°, 9.9°, 12.5°, 16.3°, 18.6°, 25.1° and 28.3°, with respect to $CuK_\alpha$ characteristic X-rays.

Prior to the series of treatments, the starting crystals (crystals to be subjected to the preliminary solvent treatment) may be finely ground by acid pasting or mechanical grinding. The mechanical grinding treatment of the starting crystals which precedes the preliminary solvent treatment can be carried out by means of a ball mill, a mortar, a sand mill, a kneader, an attritor, etc.

The solvent which can be used for the preliminary solvent treatment (hereinafter referred to as a first solvent) and that for the solvent treatment according to the present invention (hereinafter referred to as a second solvent) may be the same or different and are preferably selected from amides (e.g., N,N-dimethylformamide, N,N-dimethylacetamide, and N-methylpyrrolidone), esters (e.g., ethyl acetate, n-butyl acetate, and iso-amyl acetate), and ketones (e.g., acetone, methyl ethyl ketone, and methyl isobutyl ketone), mixtures thereof, and mixtures of these solvents and water.

The amount of the solvent to be used in the first and second solvent treatments ranges from 1 to 200 parts by weight, and preferably from 10 to 100 parts by weight, per part by weight of hydroxygallium phthalocyanine.

Each solvent treatment can be carried out in an appropriate container at a temperature of from 0° to 200° C., and preferably from room temperature to 150° C., either by allowing to stand or by stirring. The first or second solvent treatment may be effected while wet grinding by means of a ball mill, a mortar, a sand mill, a kneader, an attritor, etc. Grinding aids, such as sodium chloride and sodium sulfate (salt cake), may be used in the wet grinding. There are thus obtained hydroxygallium phthalocyanine crystals having satisfactory crystal properties and a regular crystal size.

If the crystals having been treated with a solvent selected from amides, esters and ketones are washed with a low-boiling alcohol, e.g., methyl alcohol, there is possibility that part of the hydroxygallium phthalocyanine crystals are transformed, resulting in the failure of obtaining a desired pure crystal form. Such crystal transformation does not occur when washing of crystals is conducted with amides, esters or ketones.

Figure 11:
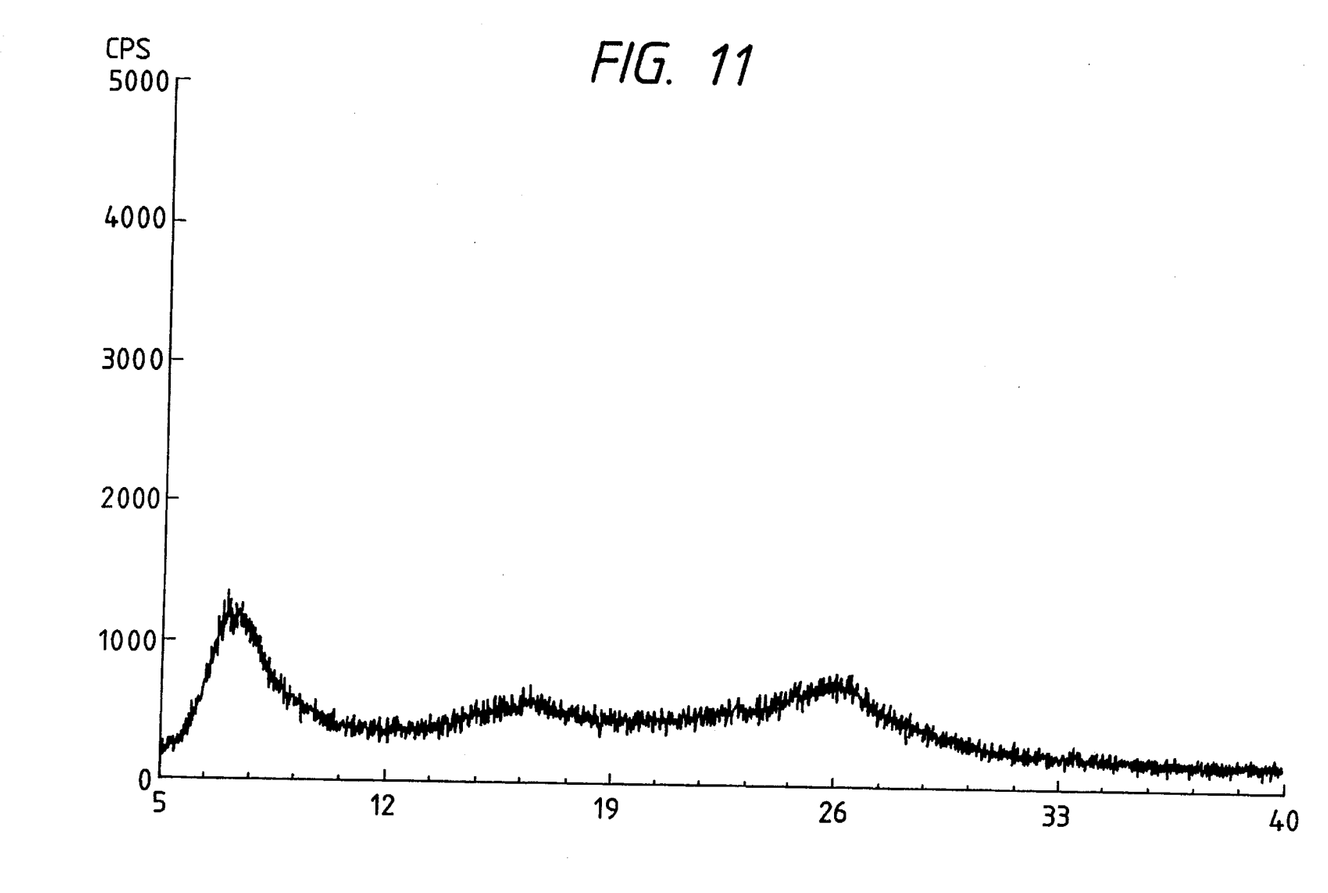
FIG. 11 is a powder X-ray diffraction pattern of hydroxygallium phthalocyanine crystals showing a suitable degree of grinding.

The mechanical grinding following the first solvent treatment and preceding the second solvent treatment is carried out by means of a ball mill, a mortar, a sand mill, a kneader, an attritor, and so on. The grinding time varies depending on the apparatus used. It is preferable to continue grinding until the resulting grains show no clear peak except a peak(s) between Bragg angles (2θ±0.2°) of 7.0° and 7.4° with respect to $CuK_\alpha$ characteristic X-rays as shown in FIG. 11. A suitable grinding temperature ranges from room temperature to 100° C. For example, where "LABO-MILL MODEL UT-21" manufactured by Yamato Kagaku Co., Ltd. is used, the starting compound weighing from 1 to 20 g is charged and milled for a period of from about 0.5 to 200 hours, and preferably from about 3 to 10 hours.

While the conventionally prepared hydroxygallium phthalocyanine crystals suffer from many defects, the process of the present invention provides defect-free hydroxygallium phthalocyanine crystals. Such defect-free hydroxygallium phthalocyanine crystals provide an electrophotographic photoreceptor with excellent electrophotographic characteristics.

Crystal transformation of hydroxygallium phthalocyanine takes place through the above-mentioned series of treatments to thereby prepare hydroxygallium phthalocyanine crystals showing intense diffraction peaks at Bragg angles (2θ±0.2) of 7.5°, 25.1°, and 28.3°, and preferably 7.5°, 9.9°, 12.5°, 16.3°, 18.6°, 25.1° and 28.3°, with respect to $CuK_\alpha$ characteristic X-rays, which exhibit high sensitivity and excellent durability.

The electrophotographic photoreceptor according to the present invention in which the above-described hydroxygallium phthalocyanine crystals are used as a charge generating material in the photosensitive layer thereof will be explained below.

A photosensitive layer of the photoreceptor may have a single layer structure or a so-called separate function type laminate structure composed of a charge generating layer and a charge transporting layer.

Figure 1:
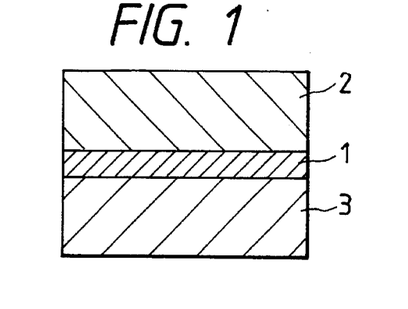
FIGS. 1 through 4 each show a schematic cross section of an electrophotographic photoreceptor according to the present invention.
Figure 2:
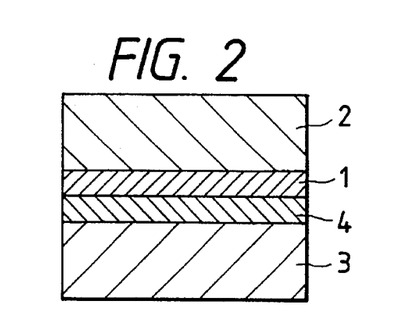
Figure 3:
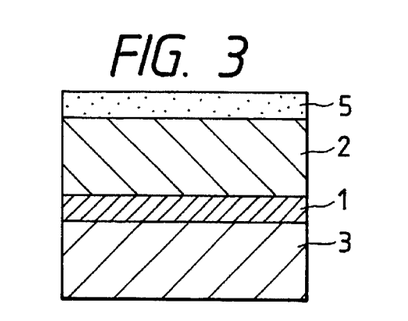
Figure 4:
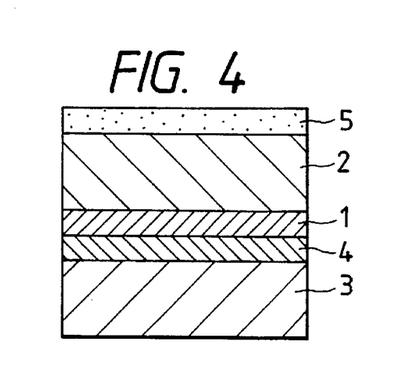

A schematic cross section of the photoreceptor according to the present invention is shown in FIGS. 1 through 4. The photoreceptor of FIG. 1 comprises conductive substrate 3 having provided thereon photosensitive layer composed of charge generating layer 1 and charge transporting layer 2 laminated on charge generating layer 1. Subbing layer 4 may be provided between charge generating layer 1 and conductive substrate 3 as shown in FIG. 2. Protective layer 5 may be provided on the surface of the photosensitive layer as shown in FIG. 3. The photoreceptor of FIG. 4 has both subbing layer 4 and protective layer 5.

Charge generating layer 1 is composed of the hydroxygallium phthalocyanine crystals prepared by the process of the present invention and a binder resin.

Binder resins to be used can be chosen from a broad range of insulating resins, such as polyvinyl butyral resins, polyarylate resins (e.g., a polycondensate of bisphenol A and phthalic acid), polycarbonate resins, polyester resins, phenoxy resins, vinyl chloride-vinyl acetate copolymers, polyvinyl acetate resins, acrylic resins, polyacrylamide resins, polyvinyl pyridine resins, cellulose resins, polyurethane resins, epoxy resins, casein, polyvinyl alcohol resins, and polyvinyl pyrrolidone resins. Organic photoconductive polymers, such as poly-N-vinylcarbazole, polyvinyl anthracene, and polyvinylpyrene, can also be used. These specific examples are not to limit the binder resins to be used. The binder resins may be used either individually or in combination of two or more thereof.

Solvents to be used for dissolving the binder resin are preferably selected from those incapable of dissolving subbing layer 4. Examples of suitable solvents are methyl alcohol, ethyl alcohol, n-propyl alcohol, n-butyl alcohol, benzyl alcohol, methyl cellosolve, ethyl cellosolve, acetone, methyl ethyl ketone, cyclohexanone, dimethylformamide, dimethylacetamide, methyl acetate, n-butyl acetate, dioxane, tetrahydrofuran, methylene chloride, chloroform, chlorobenzene, and toluene. These organic solvents may be used either individually or in combination of two or more thereof.

A weight ratio of the hydroxygallium phthalocyanine crystals to the binder resin is preferably from 10:1 to 1:10. The hydroxygallium phthalocyanine crystals can be dispersed in the resin solution by a general means, e.g., a ball mill, an attritor, or a sand mill. It is effective to finely disperse the crystals to a particle size of not greater than 0.5 μm, preferably not greater than 0.3 μm, and more preferably not greater than 0.15 μm. It is essential that the crystal form of the hydroxygallium phthalocyanine is not changed by dispersion. The inventors have confirmed that the crystal form is not changed by any of the above-mentioned dispersion methods.

Charge generating layer 1 can be formed by coating the dispersion by any of general coating techniques, such as blade coating, wire bar coating, spray coating, dip coating, bead coating, air knife coating, curtain coating, and the like. Charge generating layer 1 usually has a thickness of from 0.1 to 5 μm, and preferably from 0.2 to 2.0 μm.

Charge transporting layer 2 consists of a charge transporting material and an appropriate binder resin.

Any of known charge transporting materials can be utilized. Examples of suitable charge transporting materials, while not limiting, include oxadiazole derivatives, e.g., 2,5-bis-(p-diethylaminophenyl)-1,3,4-oxadiazole; pyrazoline derivatives, e.g., 1,3,5-triphenylpyrazoline and 1-[pyridyl(2)]-3-(p-diethylaminostyryl)-5-(p-diethylaminophenyl)pyrazoline; aromatic tertiary monoamine compounds, e.g., triphenylamine and dibenzylaniline; aromatic tertiary diamine compounds, e.g., N,N'-diphenyl-N,N'-bis(m-tolyl) benzidine; 1,2,4-triazine derivatives, e.g., 3-(p-diethylaminophenyl)-5,6-di(p-methoxyphenyl)-1,2,4-triazine; hydrazone derivatives, e.g., 4-diethylaminobenzaldehyde 2,2-diphenylhydrazone; quinazoline derivatives, e.g., 2-phenyl-4-styrylquinazoline; benzofuran derivatives, e.g., 6-hydroxy-2,3-di(p-methoxyphenyl)benzofuran; α-stilbene derivatives, e.g., p(2,2-diphenylvinyl)-N,N-diphenylaniline; enamine derivatives described in *Journal of Imaging Science*, Vol. 29, pp. 7–10 (1985); poly-N-vinylcarbazole and its derivatives, e.g., N-vinylcarbazole; poly-γ-carbazole ethylglutamate and its derivatives; pyrene, polyvinylpyrene, polyvinylanthracene, polyvinylacridine, poly-9-vinylphenylanthracene, pyrene-formaldehyde resins, and ethylcarbazole-formaldehyde resins. These charge transporting materials may be used either individually or in combination of two or more thereof.

Binder resins which can be used in charge transporting layer 2 can be selected from known binder resins, such as polycarbonate resins, polyester resins, methacrylic resins, acrylic resins, polyvinyl chloride resins, polyvinylidene chloride resins, polystyrene resins, polyvinyl acetate resins, styrene-butadiene copolymers, vinylidene chloride-acrylonitrile copolymers, vinyl chloride-vinyl acetate copolymers, vinyl chloride-vinyl acetate-maleic anhydride copolymers, silicone resins, silicone-alkyd resins, phenolformaldehyde resins, styrene-alkyd resins, and poly-N-vinylcarbazole resins. These binder resins may be used either individually or in combination of two or more thereof.

Charge transporting layer 2 can be formed by coating a coating composition comprising the above-described charge transporting material, a binder resin, and a solvent on charge generating layer 1. A suitable weight ratio of the charge transporting material to the binder resin is from 10:1 to 1:5.

Solvents to be used include aromatic hydrocarbons, e.g., benzene, toluene and xylene; halogenated hydrocarbons, e.g., chlorobenzene; ketones, e.g., acetone and methyl ethyl ketone; halogenated aliphatic hydrocarbons, e.g., methylene chloride, chloroform and ethylene chloride; and cyclic or acyclic ethers, e.g.,tetrahydrofuran and ethyl ether. These organic solvents may be used either individually or in combination of two or more thereof.

Coating techniques include blade coating, wire bar coating, spray coating, dip coating, bead coating, air knife coating, and curtain coating.

Charge transporting layer 2 usually has a thickness of from 5 to 50 μm, and preferably of from 10 to 30 μm.

Where a photosensitive layer has a single layer structure, the photosensitive layer comprises a photoconductive layer in which the above-described hydroxygallium phthalocyanine crystals and charge transporting material are dispersed in a binder resin. The components and coating technique used here are the same as those hereinabove described.

Conductive substrate 3 includes metals, e.g., aluminum, nickel, chromium, and stainless steel; plastic films having thereon a thin film of aluminum, titanium, nickel, chromium, stainless steel, gold, vanadium, tin oxide, indium oxide, indium-tin oxide, etc.; and paper or plastic films having coated thereon or impregnated therein a conductivity imparting agent. While not limiting, conductive substrate 3 usually has a shape of a drum, a sheet, or a plate.

If desired, conductive substrate 3 may be subjected to various surface treatments as far as the image quality is not impaired. For example, it is subjected to an oxidation treatment, a chemical treatment, a coloring treatment, or a non-specular finish, such as surface graining.

If desired, subbing layer 4 may be provided between conductive substrate 3 and a photosensitive layer. Subbing layer 4 is effective for blocking unnecessary charges which may be introduced from conductive substrate 3 into a photosensitive layer on charging of the photosensitive layer. It also serves to improve adhesion between conductive substrate 3 and the photosensitive layer. In some cases, subbing layer 4 produces an effect of preventing light reflection on conductive substrate 3.

Materials for constituting subbing layer 4 include polyethylene resins, polypropylene resins, acrylic resins, methacrylic resins, polyamide resins, vinyl chloride resins, vinyl acetate resins, phenol resins, polycarbonate resins, polyurethane resins, polyimide resins, vinylidene chloride resins, polyvinyl acetal resins, vinyl chloride-vinyl acetate copolymers, polyvinyl alcohol resins, water-soluble polyester resins, nitrocellulose, casein, gelatin, polyglutamic acid, starch, starch acetate, amino starch, polyacrylic acid resins, polyacrylamide resins, zirconium chelate compounds, organotitanium compounds (e.g., titanyl chelate compounds and titanium alkoxide compounds), and silane coupling agents.

Coating of subbing layer 4 can be carried out in a usual manner, for example, blade coating, wire bar coating, spray coating, dip coating, bead coating, air knife coating, and curtain coating. Subbing layer 4 usually has a thickness of from 0.01 to 10 μm, and preferably from 0.05 to 2 μm.

Further, protective layer 5 may be provided on the surface of a photosensitive layer. Protective layer 5 serves to prevent chemical denaturation of charge transporting layer 2 upon charging and also to improve mechanical strength of the photosensitive layer.

Protective layer 5 comprises an appropriate binder resin having dispersed therein a conductive material. Specific but non-limiting examples of the conductive materials are metallocene compounds, such as dimethylferrocene; aromatic amine compounds, such as N,N'-diphenyl-N,N'-bis(m-tolyl)benzidine; and metal oxides, such as antimony oxide, tin oxide, titanium oxide, indium oxide, and tin-antimony oxide. The binder resin to be used is conventional and includes polyamide resins, polyurethane resins, polyester resins, epoxy resins, polyketone resins, polycarbonate resins, polyvinyl ketone resins, polystyrene resins, and polyacrylamide resins.

Protective layer 5 is preferably designed so as to have a volume resistivity of from $10^9$ to $10^{14}$ Ω.cm. If the volume resistivity exceeds $10^{14}$ Ω.cm, the residual potential tends to increase, causing fog. If it is lower than $10^9$ Ω.cm, the image obtained tends to suffer from blurs and a reduction in resolving power. In addition, protective layer 5 should be designed so as not to substantially interfere with transmission of imagewise irradiated light.

Coating of protective layer 5 can be carried out in a usual manner, for example, blade coating, wire bar coating, spray coating, dip coating, bead coating, air knife coating, and curtain coating. Protective layer 5 usually has a thickness of from 0.5 to 20 μm, and preferably from 1 to 10 μm.

The present invention is now illustrated in greater detail with reference to Examples, but it should be understood that the present invention is not deemed to be limited thereto. All the parts and percents are by weight unless otherwise indicated.

SYNTHESIS EXAMPLE

Synthesis of Hydroxygallium Phthalocyanine

To 230 parts of quinoline were added 30 parts of 1,3-diiminoisoindoline and 9.1 parts of gallium trichloride, and the mixture was allowed to react at 200° C. for 3 hours. The reaction product was collected by filtration and washed successively with acetone and methyl alcohol, and the wet cake was dried to obtain 28 parts of chlorogallium phthalocyanine crystals.

Three parts of the resulting chrologallium phthalocyanine crystals were dissolved in 60 parts of concentrated sulfuric acid at 0° C., and the solution was added dropwise to 450 parts of distilled water at 5° C. to precipitate crystals. The crystals were washed with distilled water, diluted aqueous ammonia, etc. and dried to obtain 2.5 parts of hydroxygallium phthalocyanine crystals.

Elementary Analysis for $C_{32}H_{17}N_8OGa$: Calcd. (%): C 64.14; H 2.86; N 18.70; Cl 0 Found (%): C 62.06; H 2.67; N 17.62; Cl 0.46

Figure 5:
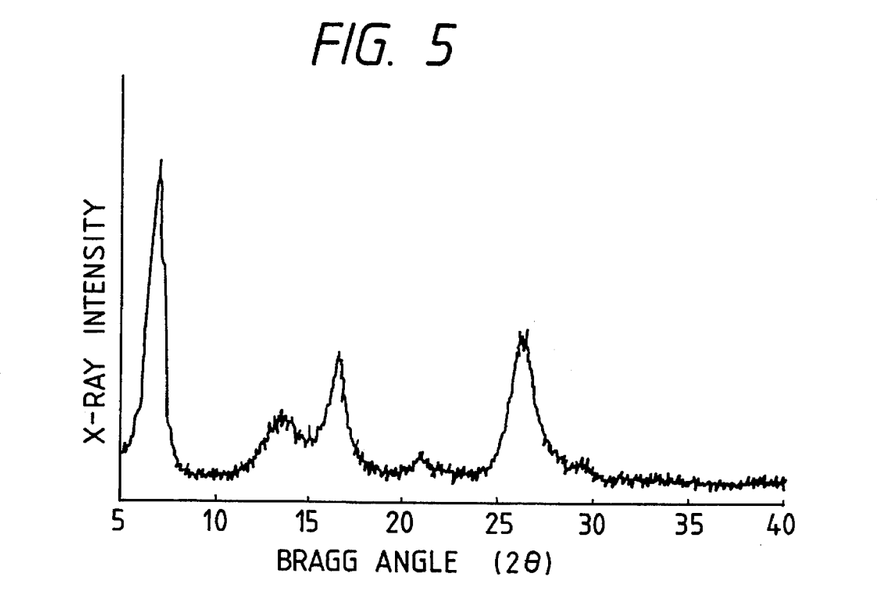
FIG. 5 is a powder X-ray diffraction pattern of the hydroxygallium phthalocyanine crystals obtained in Synthesis Example.
Figure 6:
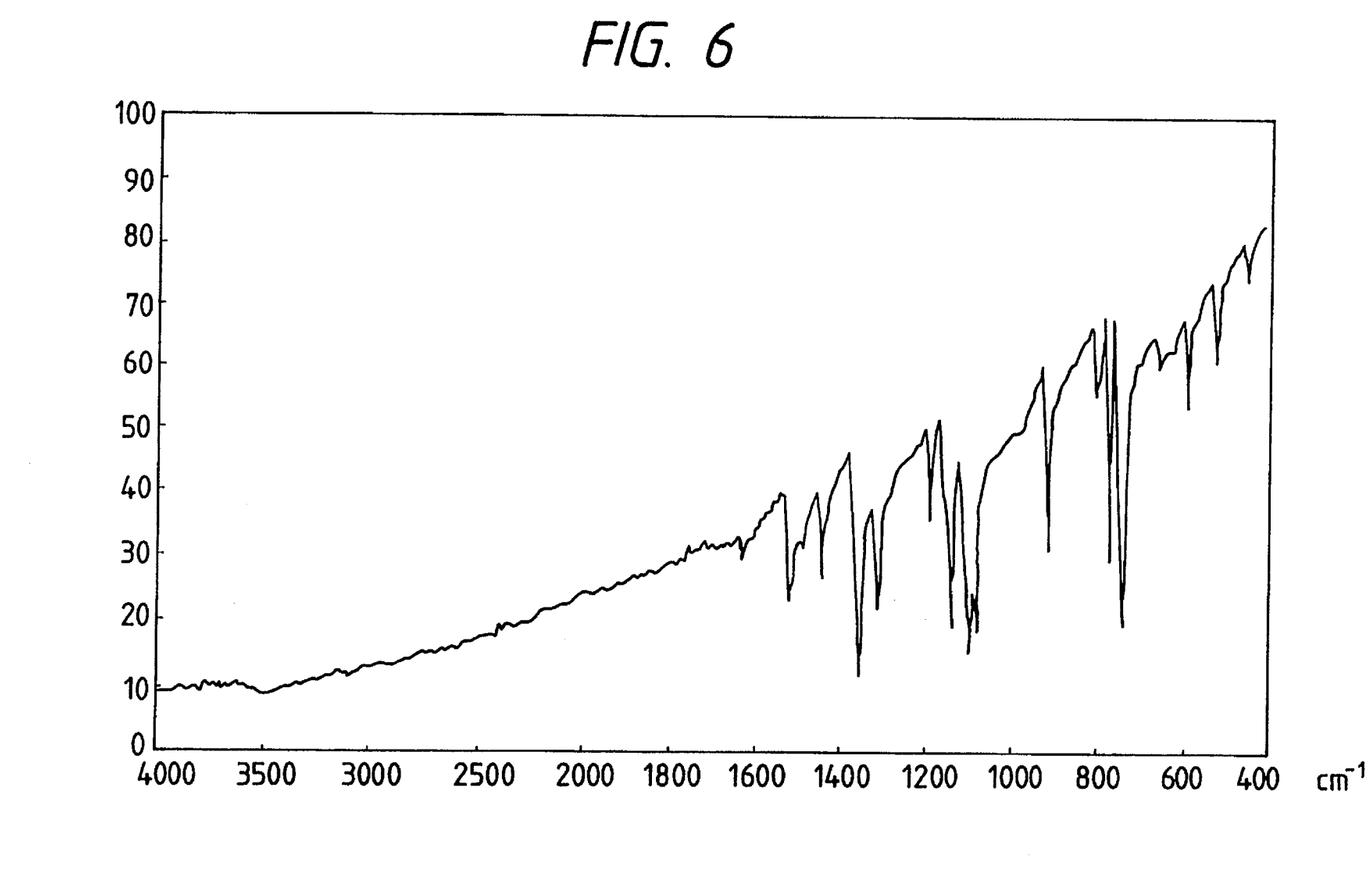
FIG. 6 is an IR spectrum of the hydroxygallium phthalocyanine crystals obtained in Synthesis Example.

A powder X-ray diffraction pattern and an IR spectrum of the resulting hydroxygallium phthalocyanine crystals are shown in FIG. 5 and 6, respectively.

EXAMPLE 1

Three parts of the hydroxygallium phthalocyanine obtained in Synthesis Example were added to 50 parts of dimethylformamide, followed by stirring at 100° C. for 28 hours. The crystals were separated, washed with methyl alcohol, and dried. The crystals were milled in an automatic mortar for 5 hours to obtain 2.7 parts of hydroxygallium phthalocyanine.

One part of the resulting hydroxygallium phthalocyanine was milled together with 15 parts of dimethylformamide and 30 parts of glass beads having a diameter of 1 mm for 24 hours. The collected crystals were washed with n-butyl acetate and dried to recover 0.9 part of hydroxygallium phthalocyanine crystals.

Elementary Analysis for $C_{32}H_{17}N_8OGa$: Calcd. (%): C 64.14; H 2.86; N 18.70; Cl 0 Found (%): C 63.37; H 2.58; N 18.15; Cl 0.31

Figure 7:
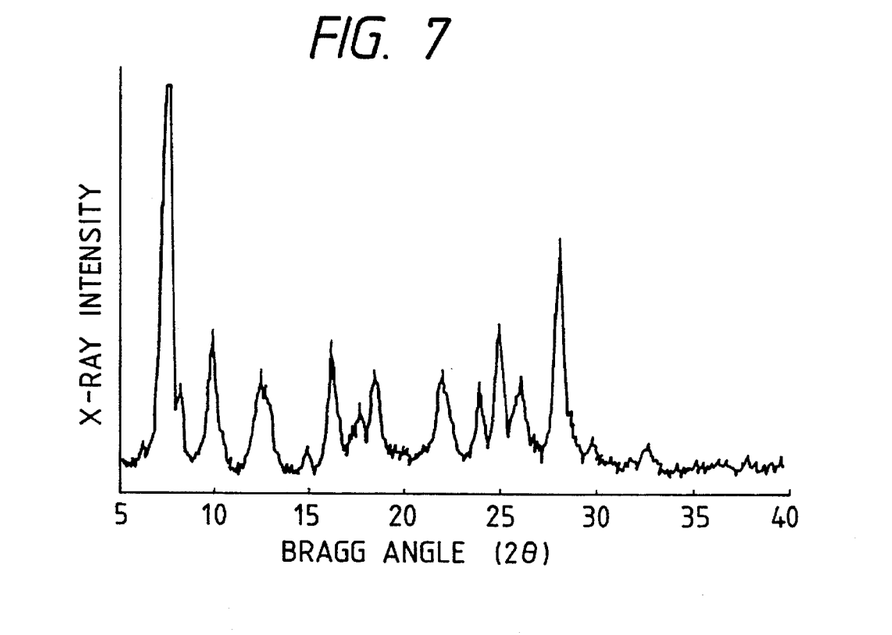
FIG. 7 is a powder X-ray diffraction pattern of the hydroxygallium phthalocyanine crystals obtained in Example 1.
Figure 8:
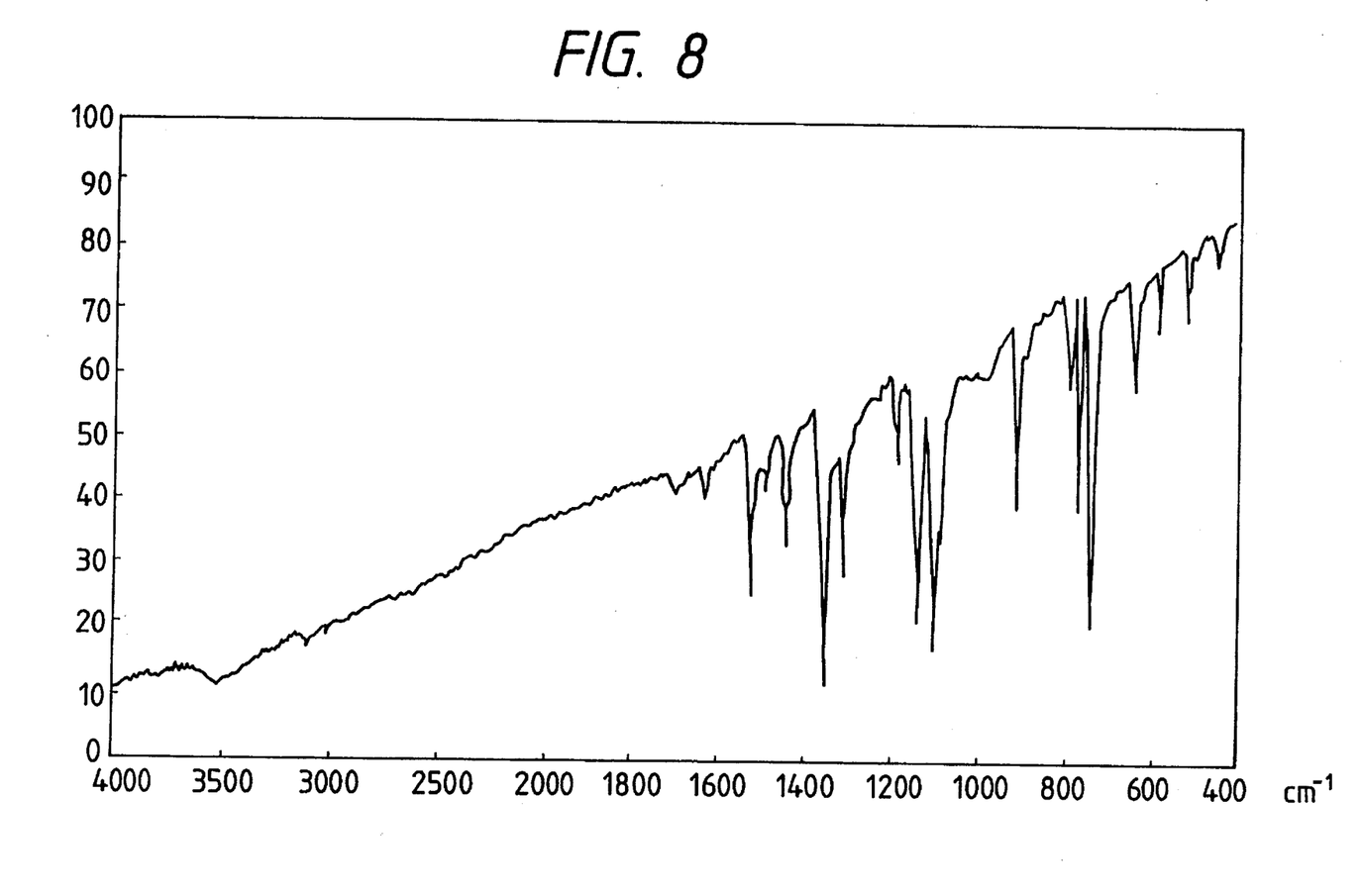
FIG. 8 is an IR spectrum of the hydroxygallium phthalocyanine crystals obtained in Example 1.

A powder X-ray diffraction pattern and an IR spectrum of the resulting hydroxygallium phthalocyanine crystals are shown in FIG. 7 and 8, respectively.

EXAMPLE 2

Three parts of the hydroxygallium phthalocyanine crystals obtained in Synthesis Example were dissolved in 80 parts of concentrated sulfuric acid at 0° C., and the solution was added dropwise to 450 parts of distilled water at 5° C. to precipitate crystals. The crystals collected were washed with distilled water, dilute aqueous ammonia, etc., and dried to obtain 2.6 parts of hydroxygallium phthalocyanine crystals. To 25 parts of dimethylformamide was added 1.5 parts of the resulting crystals, followed by stirring at 100° C. for 28 hours. The crystals were collected, washed with methyl alcohol, dried, and milled in an automatic mortar for 5 hours to obtain 1.1 part of hydroxygallium phthalocyanine.

One part of the resulting crystals was milled together with 15 parts of dimethylformamide and 30 parts of glass beads having a diameter of 1 mm for 24 hours. The crystals were collected, washed with n-butyl acetate and dried to recover 0.9 part of hydroxygallium phthalocyanine crystals.

Figure 9:
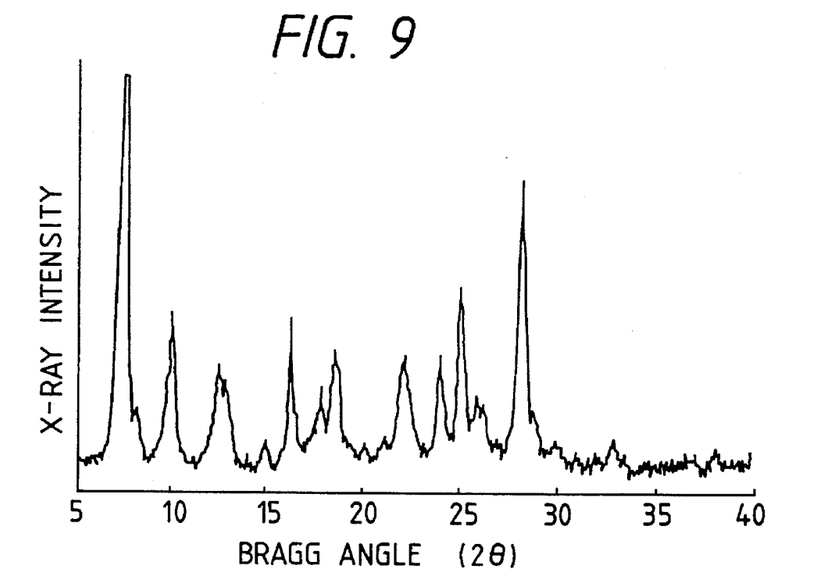
FIG. 9 is a powder X-ray diffraction pattern of the hydroxygallium phthalocyanine crystals obtained in Example 2.

A powder X-ray diffraction pattern of the resulting hydroxygallium phthalocyanine crystal is shown in FIG. 9. The IR spectrum of the crystal was the same as FIG. 8.

EXAMPLE 3

A solution consisting of 10 parts of a zirconium compound "Orgatics ZC 540" (produced by Matsumoto Seiyaku K.K.), 1 part of a silane compound "A 1110" (produced by Nippon Unicar Co., Ltd.), 40 parts of isopropyl alcohol, and 20 parts of butyl alcohol was coated on an aluminum substrate by dip coating and dried by heating at 160° C. for 10 minutes to form subbing layer 4 having a thickness of 0.1 μm.

One part of the hydroxygallium phthalocyanine crystals obtained in Example 1 was mixed with 1 part of a polyvinyl butyral resin "S-Lec BM-1" (produced by Sekisui Chemical Co., Ltd.) and 100 parts of n-butyl acetate, and the mixture was dispersed in a paint shaker together with glass beads for 1 hour. The resulting dispersion was coated on the subbing layer by dip coating and dried by heating at 100° C. for 10 minutes to form charge generating layer 1 having a thickness of 0.15 μm. X-Ray diffractometry of the hydroxygallium phthalocyanine crystals in the dispersion revealed that the crystal form had not changed on being dispersed.

In 20 parts of monochlorobenzene were dissolved 2 parts of N,N'-diphenyl-N,N'-bis(m-tolyl)benzidine represented by formula (1):

and 3 parts of poly[1,1-di(p-phenylene)cyclohexane carbonate)] represented by formula (2):

Mw=39000 (viscosity-average molecular weight) and the resulting coating composition was coated on the charge generating layer by dip coating and dried by heating at 120° C. for 1 hour to form charge transporting layer 2 having a thickness of 20 μm.

Electrophotographic characteristics of the thus prepared electrophotographic photoreceptor were evaluated by using an electrostatic analyzer "EPA-8100" manufactured by Kawaguchi Denki Co. The photoreceptor was charged to −6 kV by a corona discharge under a normal temperature and normal humidity condition (20° C., 40% RH) and then exposed to monochromatic light of 800 nm, which was isolated from light emitted from a tungsten lamp by means of a monochrometer and adjusted to 1 μW/cm² on the surface of the photoreceptor. The surface potential $V_0$ (V) and the exposure amount necessary for reducing the surface potential to ½ of the initial potential $E_{1/2}$ (erg/cm²) were measured. Then, the photoreceptor was exposed to white light of 10 lux for 1 second, and the residual potential $V_{RP}$ (V) was measured. The above charging and exposure were repeated 1000 times, and $V_0$, $E_{1/2}$, and $V_{RP}$ were measured. The changes in $V_0$, $E_{1/2}$, and $V_{RP}$ after the repetition were expressed as $\Delta V_0$, $\Delta E_{1/2}$, and $\Delta V_{RP}$, respectively. The results of these measurements are shown in Table 1 below.

EXAMPLE 4

An electrophotographic photoreceptor was prepared in the same manner as in Example 3, except for using the hydroxygallium phthalocyanine crystals obtained in Example 2 in place of the hydroxygallium phthalocyanine crystals obtained in Example 1. The resulting photoreceptor was evaluated in the same manner as in Example 3. The results obtained are shown in Table 1.

COMPARATIVE SYNTHESIS EXAMPLE

Figure 10:
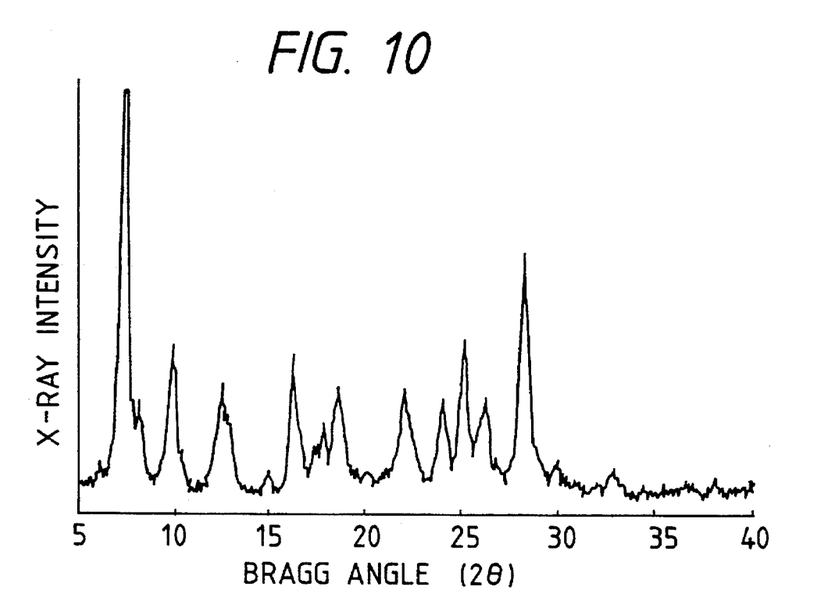
FIG. 10 is a powder X-ray diffraction pattern of the hydroxygallium phthalocyanine crystals obtained in Comparative Synthesis Example.

One part of the hydroxygallium phthalocyanine crystals obtained in Synthesis Example was milled together with 15 parts of dimethylformamide and 30 parts of glass beads having a diameter of 1 mm for 24 hours. The crystals were collected, washed with n-butyl acetate and dried to recover 0.9 part of hydroxygallium phthalocyanine crystals. A powder X-ray diffraction pattern of the resulting crystals is shown in FIG. 10. The IR spectrum of the crystals was the same as FIG. 8.

COMPARATIVE EXAMPLE 1

A comparative photoreceptor was prepared in the same manner as in Example 3, except for using the hydroxygallium phthalocyanine crystals obtained in Comparative Synthesis Example in place of those obtained in Example 1. The photoreceptor was evaluated in the same manner as in Example 3. The results obtained are shown in Table 1.

COMPARATIVE EXAMPLE 2

One part of the hydroxygallium phthalocyanine obtained in Synthesis Example was milled together with 15 parts of dimethylsulfoxide and 30 parts of glass beads having a diameter of 1 mm for 24 hours. The collected crystals were washed with dimethylsulfoxide and dried to recover 0.9 part of hydroxygallium phthalocyanine crystals.

Figure 12:
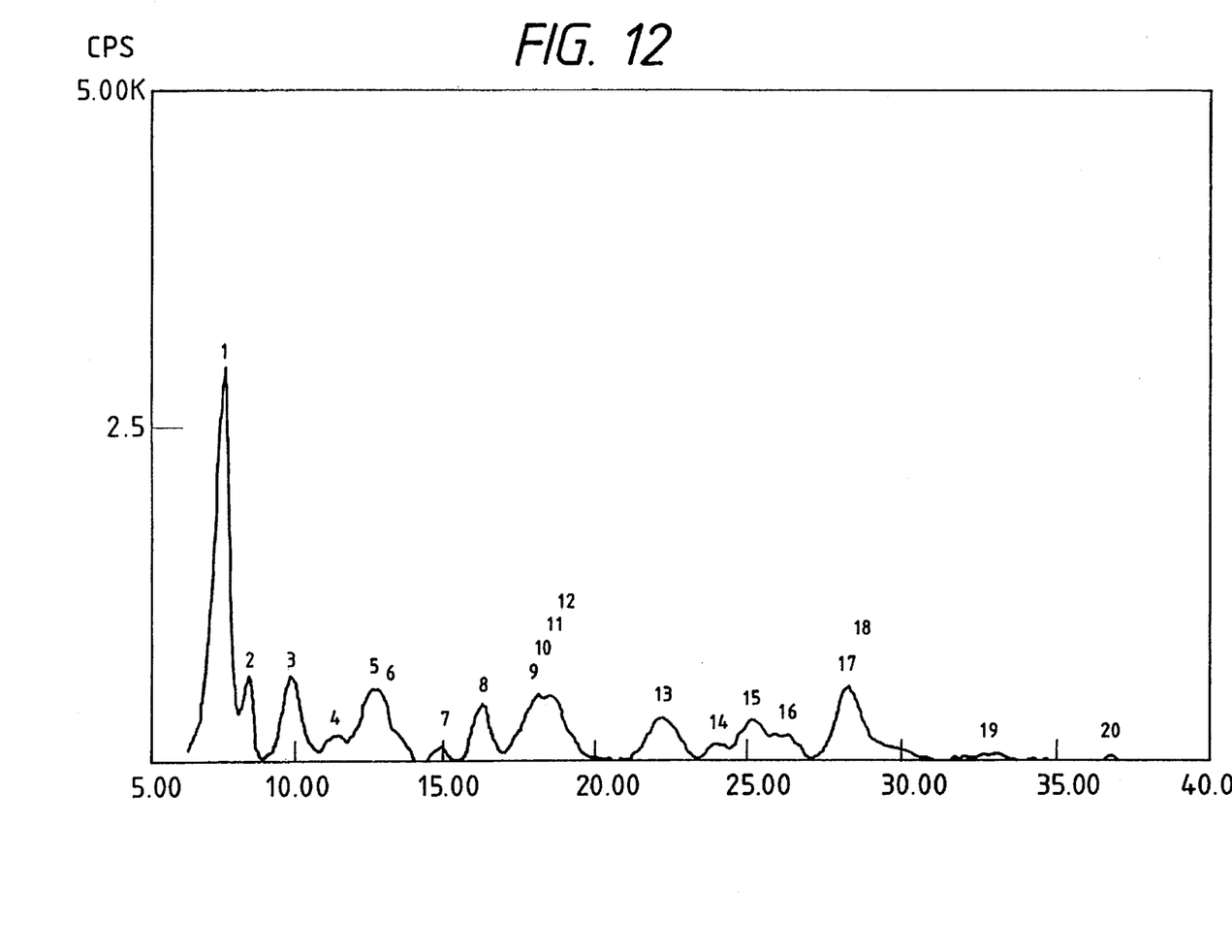
FIG. 12 is a powder X-ray diffraction pattern of the hydroxygallium phthalocyanine crystals obtained in Comparative Example 2.

A powder X-ray diffraction pattern of the resulting hydroxygallium phthalocyanine crystals is shown in FIG. 12. This X-ray diffraction pattern shows a decreased crystallinity of the crystals as compared to the crystals obtained in Example 1. Further, it was seen variation of a weak and broad peak position such as the peak positioned around 12.5°.

COMPARATIVE EXAMPLE 3

One part of the hydroxygallium phthalocyanine obtained in Synthesis Example was milled together with 15 parts of dimethylformamide and 30 parts of glass beads having a diameter of 1 mm for 24 hours. The collected crystals were washed with methyl alcohol and dried to recover 0.9 part of hydroxygallium phthalocyanine crystals.

Figure 13:
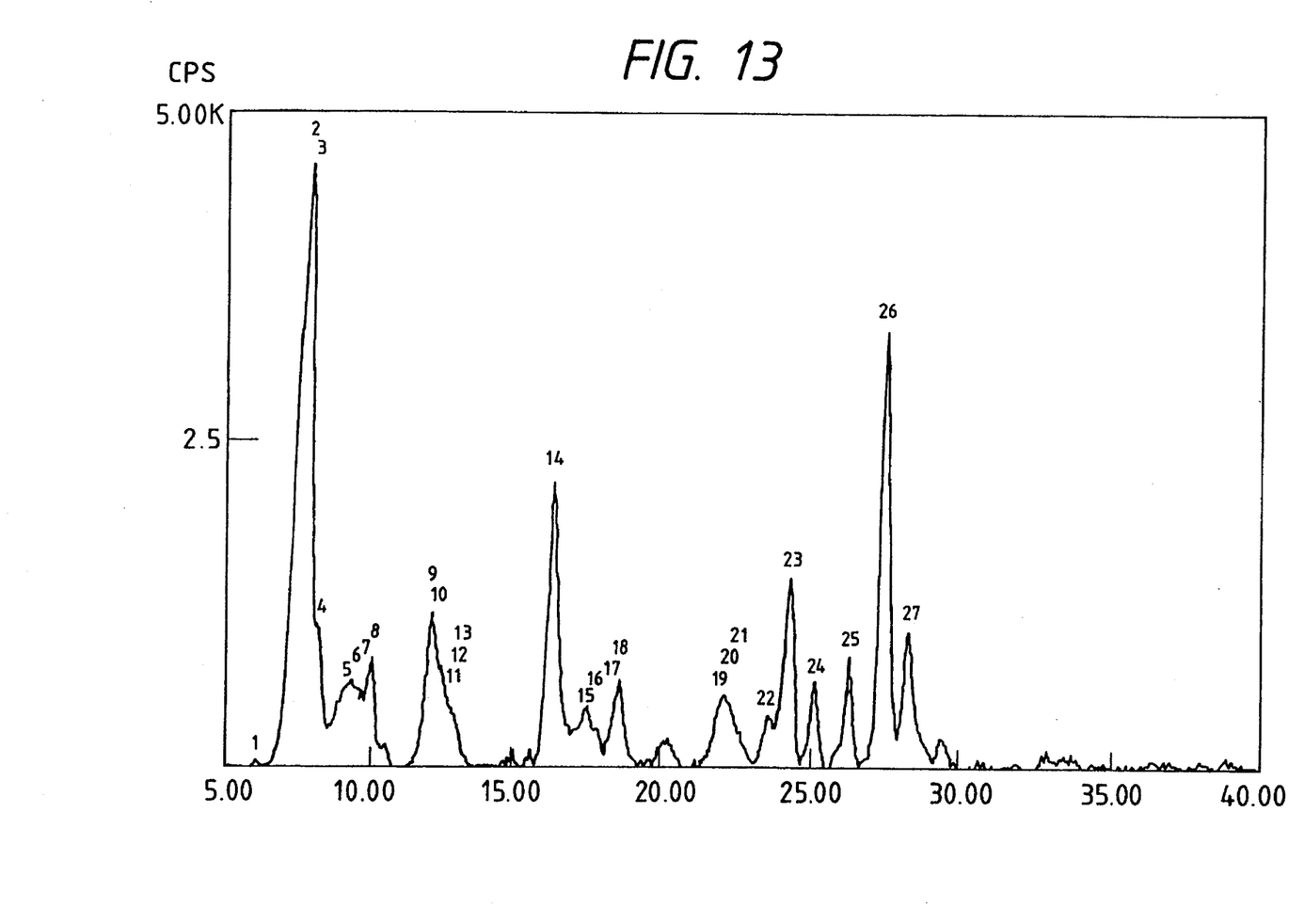
FIG. 13 is a powder X-ray diffraction pattern of the hydroxygallium phthalocyanine crystals obtained in Comparative Example 3.

A powder X-ray diffraction pattern of the resulting hydroxygallium phthalocyanine crystals is shown in FIG.

13. As is seen from this X-ray diffraction pattern, the peak positioned around 12.5° forms a shoulder. This would be caused by mixing the hydroxygallium phthalocyanine with other crystal forms.

COMPARATIVE EXAMPLE 4

An electrophotographic photoreceptor was prepared in the same manner as in Example 3, except for using the hydroxygallium phthalocyanine crystals obtained in Comparative Example 2 in place of the hydroxygallium phthalocyanine crystals obtained in Example 1. The resulting photoreceptor was evaluated in the same manner as in Example 3. The results obtained are shown in Table 1.

COMPARATIVE EXAMPLE 5

An electrophotographic photoreceptor was prepared in the same manner as in Example 3, except for using the hydroxygallium phthalocyanine crystals obtained in Comparative Example 3 in place of the hydroxygallium phthalocyanine crystals obtained in Example 1. The resulting photoreceptor was evaluated in the same manner as in Example 3. The results obtained are shown in Table 1.

the hydroxygallium phthalocyanine with a solvent.

2. A process as claimed in claim 1, wherein the hydroxygallium phthalocyanine to be mechanically ground has preliminarily been treated with a solvent.

3. A process as claimed in claim 2, wherein the hydroxygallium phthalocyanine to be preliminarily treated with a solvent has been finely ground by acid pasting or mechanical grinding.

4. A process as claimed in claim 2, wherein the solvent for the preliminary solvent treatment is the same as that to be used for the final solvent treatment.

5. A process as claimed in claim 1, wherein said solvent is selected from amides, esters, and ketones.

6. A process as claimed in claim 2, wherein said solvent for the preliminary solvent treatment is selected from amides, esters, and ketones.

7. A process as claimed in claim 1, wherein said hydroxygallium phthalocyanine crystals show intense diffraction peaks at Bragg angles ($2\theta \pm 0.2$) of 7.5°, 9.9°, 12.5°, 16.3°, 18.6°, 25.1°, and 28.3° with respect to $CuK_\alpha$ characteristic X-rays.

8. A process for preparing hydroxygallium phthalocyanine crystals as claimed in claim 1, comprising the steps of:

TABLE 1

| Example No. | Charge Generating Material | Initial Characteristics | | | Retained Characteristics (after 1000 repetitions) | | | Stability | Durability | |
|---|---|---|---|---|---|---|---|---|---|---|
| | | $V_0$ (V) | $E_{1/2}$ (erg/cm$^2$) | $V_{RP}$ (V) | $V_0$ (V) | $E_{1/2}$ (erg/cm$^2$) | $R_{RP}$ (V) | $\Delta E_{1/2}$ (erg/cm$^2$) | $\Delta V_0$ (V) | $\Delta V_{RP}$ (V) |
| Example 3 | Crystals of Example 1 (FIG. 7) | −816 | 1.8 | −20 | −805 | 1.9 | −25 | 0.1 | 11 | 5 |
| Example 4 | Crystals of Example 2 (FIG. 9) | −821 | 1.8 | −18 | −813 | 1.9 | −24 | 0.1 | 8 | 6 |
| Comparative Example 1 | Crystals of Comparative Syn. Example (FIG. 10) | −815 | 2.2 | −21 | −803 | 2.5 | −26 | 0.3 | 12 | 5 |
| Comparative Example 4 | Crystals of Comparative Example 2 (FIG. 12) | −820 | 2.6 | −25 | −805 | 2.7 | −33 | 0.1 | 15 | 8 |
| Comparative Example 5 | Crystals of Comparative Example 3 (FIG. 13) | −820 | 2.8 | −30 | −810 | 2.9 | −35 | 0.1 | 10 | 5 |

As described above, the hydroxygallium phthalocyanine crystals obtained by the process of the present invention has a novel crystal form and exhibits high sensitivity and excellent durability on repeated use as well as crystal form stability. An electrophotographic photoreceptor prepared by using the hydroxygallium phthalocyanine as a charge generating material exhibits excellent electrophotographic characteristics.

While the invention has been described in detail and with reference to specific examples thereof, it will be apparent to one skilled in the art that various changes and modifications can be made therein without departing from the spirit and scope thereof.

What is claimed is:

1. A process for preparing hydroxygallium phthalocyanine crystals showing intense diffraction peaks at Bragg angles ($2\theta \pm 0.2$) of 7.5°, 25.1°, and 28.3° with respect to $CuK_\alpha$ characteristic X-rays which comprises mechanically grinding hydroxygallium phthalocyanine and then treating (a) synthesizing hydroxygallium phthalocyanine;

(b) treating the hydroxygallium phthalocyanine with a solvent;

(c) grinding the hydroxygallium phthalocyanine; followed by (d) treating the hydroxygallium phthalocyanine with a solvent.

9. A process as claimed in claim 8, wherein step (d) comprises milling said hydroxygallium phthalocyanine in the presence of said solvent.

10. A process as claimed in claim 8, wherein step (a) comprises synthesizing said hydroxygallium phthalocyanine from chlorogallium phthalocyanine and grinding said synthesized hydroxygallium phthalocyanine by acid pasting or mechanical grinding.

11. A process as claimed in claim 8, wherein said solvent of step (b) or step (d) is selected from the group consisting of amides, esters and ketones.

12. A process as claimed in claim 8, wherein said solvent is selected from N,N-dimethylformamide, N,N-dimethylacetamide, N-methylpyrrolidone, ethyl acetate, n-butyl acetate, iso-amyl acetate, acetone, methyl ethyl ketone and methyl isobutyl ketone.

13. An electrophotographic photoreceptor comprising a conductive substrate having thereon a photosensitive layer containing hydroxygallium phthalocyanine crystals showing intense diffraction peaks at Bragg angles ($2\theta\pm0.2$) of 7.5°, 25.1°, and 28.3° with respect to $CuK_\alpha$ characteristic X-rays which are prepared by a process comprising mechanically grinding hydroxygallium phthalocyanine and then treating the grains with a solvent.

14. An electrophotographic photoreceptor as claimed in claim 13, wherein the hydoxygallium phthalocyanine to be mechanically ground has preliminarily been treated with a solvent.

15. An electrophotographic photoreceptor as claimed in claim 14, wherein the hydroxygallium phthalocyanine to be preliminarily treated with a solvent has been finely ground by acid pasting or mechanical grinding.

16. An electrophotographic photoreceptor as claimed in claim 14, wherein the solvent for the preliminary solvent treatment is the same as that to be used for the final solvent treatment.

17. An electrophotographic photoreceptor as claimed in claim 14, wherein said solvent for the preliminary solvent treatment is selected from amides, esters, and ketones.

18. An electrophotographic photoreceptor as claimed in claim 13, wherein said solvent is selected from amides, esters, and ketones.

19. An electrophotographic photoreceptor as claimed in claim 13, wherein said hydroxygallium phthalocyanine crystals show intense diffraction peaks at Bragg angles ($2\theta\pm0.2$) of 7.5°, 9.9°, 12.5°, 16.3°, 18.6°, 25.1°, and 28.3° with respect to $CuK_\alpha$ characteristic X-rays.

* * * * *